(12) United States Patent
Gambarelli et al.

(10) Patent No.: US 7,651,310 B2
(45) Date of Patent: Jan. 26, 2010

(54) SYSTEM FOR SINGLING AND TRANSFERRING OBJECTS, AND TRANSFER DEVICE USED IN THE SYSTEM

(75) Inventors: Franco Gambarelli, Spezzano di Fiorano (IT); Roberto Vecchi, Spilamberto (IT)

(73) Assignee: Swisslog Italia S.p.A., Milan (IT)

( * ) Notice: Subject to any disclaimer, the term of this patent is extended or adjusted under 35 U.S.C. 154(b) by 241 days.

(21) Appl. No.: 10/496,167

(22) PCT Filed: Nov. 20, 2002

(86) PCT No.: PCT/IB02/04901

§ 371 (c)(1),
(2), (4) Date: May 19, 2004

(87) PCT Pub. No.: WO03/043913

PCT Pub. Date: May 30, 2003

(65) Prior Publication Data

US 2004/0253083 A1   Dec. 16, 2004

(30) Foreign Application Priority Data

Nov. 20, 2001   (IT)   ............... BO2001A0702

(51) Int. Cl.
*B65B 21/02*   (2006.01)
(52) U.S. Cl. ............ 414/403; 414/404; 414/409; 414/280; 414/281
(58) Field of Classification Search ............ 414/403, 414/404, 409, 280, 281
See application file for complete search history.

(56) References Cited

U.S. PATENT DOCUMENTS

| | | | |
|---|---|---|---|
| 3,782,564 A | | 1/1974 | Burt |
| 3,978,995 A | | 9/1976 | Zollinger et al. |
| 4,389,157 A | | 6/1983 | Bernard et al. |
| 4,651,863 A | | 3/1987 | Reuter et al. |
| 4,678,390 A | | 7/1987 | Bonneton et al. |
| 4,750,633 A | | 6/1988 | Schaefer |
| 4,893,571 A | | 1/1990 | Häkli et al. |
| 4,996,820 A | * | 3/1991 | Harrison, Jr. ............ 53/69 |
| 5,290,134 A | * | 3/1994 | Baba ............ 414/404 |
| 5,380,139 A | | 1/1995 | Pohjonen et al. |

(Continued)

FOREIGN PATENT DOCUMENTS

| | | |
|---|---|---|
| GB | 2 240 543 | 8/1991 |
| JP | 05147879 A | 6/1993 |

OTHER PUBLICATIONS

International Search Report dated Mar. 26, 2003 for PCT/IB02/04901, 4 pages.

(Continued)

*Primary Examiner*—Michael S Lowe
(74) *Attorney, Agent, or Firm*—Flynn, Thiel, Boutell & Tanis, P.C.

(57) ABSTRACT

A system for singling and transferring objects comprises an inlet area and an outlet area for objects from the system, transfer means for transferring such objects comprising containment members, and retrieval means for retrieving and depositing such objects in the containment members. The transfer means may be actuated, in use, independently of the retrieval means so as to transfer one or more objects to the outlet area.

19 Claims, 7 Drawing Sheets

U.S. PATENT DOCUMENTS

| | | |
|---|---|---|
| 5,558,483 A | 9/1996 | Masuda |
| 5,588,790 A * | 12/1996 | Lichti .................... 414/331.03 |
| 5,771,667 A * | 6/1998 | McGregor et al. ............ 53/469 |
| 5,832,693 A | 11/1998 | Yuyama et al. |
| 6,073,564 A * | 6/2000 | Keskilohko ................. 111/105 |
| 6,217,274 B1 * | 4/2001 | Svyatsky et al. ............ 414/405 |
| 6,719,942 B1 * | 4/2004 | Triplett et al. ............... 264/508 |
| 2004/0037679 A1 | 2/2004 | Sato et al. |
| 2005/0002762 A1 | 1/2005 | Gambarelli et al. |

OTHER PUBLICATIONS

International Preliminary Examination Report dated Jan. 20, 2004 for PCT/IB02/04901, 10 pages.

* cited by examiner

US 7,651,310 B2

SYSTEM FOR SINGLING AND TRANSFERRING OBJECTS, AND TRANSFER DEVICE USED IN THE SYSTEM

FIELD OF THE INVENTION

The present invention relates to the field of systems for transferring objects, and in particular to a system for singling and transferring objects, and to an object transfer device used in the system. The invention was developed with particular regard, although not by way of limitation, to the field of transfer devices for pharmaceutical and medical products such as, for example, pills, phials, syringes and the like.

BACKGROUND OF THE INVENTION

It is known in many fields, for example in that of transfer devices for food products, to single and transport products, even of different dimensions and shapes, in order for them to be wrapped in protective packaging. On the basis of the technical characteristics, and sometimes on the chemical or physical characteristics, of the object to be transported and the type of packaging, various different automatic transfer devices are used.

One of the more widely used transfer systems of known type comprises transport means having a linear path, generally conveyor belts or rollers, which support and move objects of any shape and dimension from a retrieval source to a despatch outlet such as, for example, a packaging machine or a processing device. The conveyor belts may be combined with one another, for example in series or in parallel, in order to produce complex transfer systems, and are capable of working in a continuous cycle even with large quantities of objects. The conveyor belt transfer systems, however, are not particularly efficient at singling the objects transported, and frequently require further devices upstream or downstream of their path to achieve this aim.

Other transfer systems of known type comprise singling means which make it possible to transfer a single product, even of very small dimensions, by retrieving it from a position of origin and unloading it to a destination position. The retrieval means, which customarily comprise mobile articulated arms, have the principal advantage of working each time on single objects and of being able to carry out a very precise transfer in so far as they operate from and to spatial co-ordinates. In addition, compared with the conveyor belt systems, such retrieval means are not bound to a linear path. One of their principal drawbacks, however, consists precisely in the fact of being capable of transferring a single object at a time and of not being able to work rapidly with large quantities of objects.

SUMMARY OF THE INVENTION

It is an aim of the present invention to remedy the drawbacks of the systems of known type by providing a transfer system capable of transferring from two predetermined and different spatial positions single objects in large quantities and, at the same time, with great accuracy.

Another aim of the present invention is that of providing an object transfer system capable of receiving at the inlet a plurality of objects identical to and/or different from one another, and to transfer them singly and/or in groups of pre-determined number to a common outlet.

A further aim of the present invention is that of providing a transfer system which is simple, economic, easy to maintain and which proves reliable over time, even following prolonged use.

In order to achieve the aforesaid aims, the subject of the present invention is a system for singling and transferring objects and a transfer device used in the system.

One of the principal advantages of the present invention consists in the possibility of transferring at very high speed and very simply a plurality of single objects, even having different shapes and dimensions from one another, without the need to modify the shapes and/or dimensions of the system and of the transfer devices of the present invention.

Further characteristics and advantages will become clear from the following detailed description of a preferred exemplary embodiment, with reference to the appended drawings of a system for singling and transferring objects, provided purely by way of non-limiting example, in which:

DETAILED DESCRIPTION OF THE INVENTION

Figure 1:
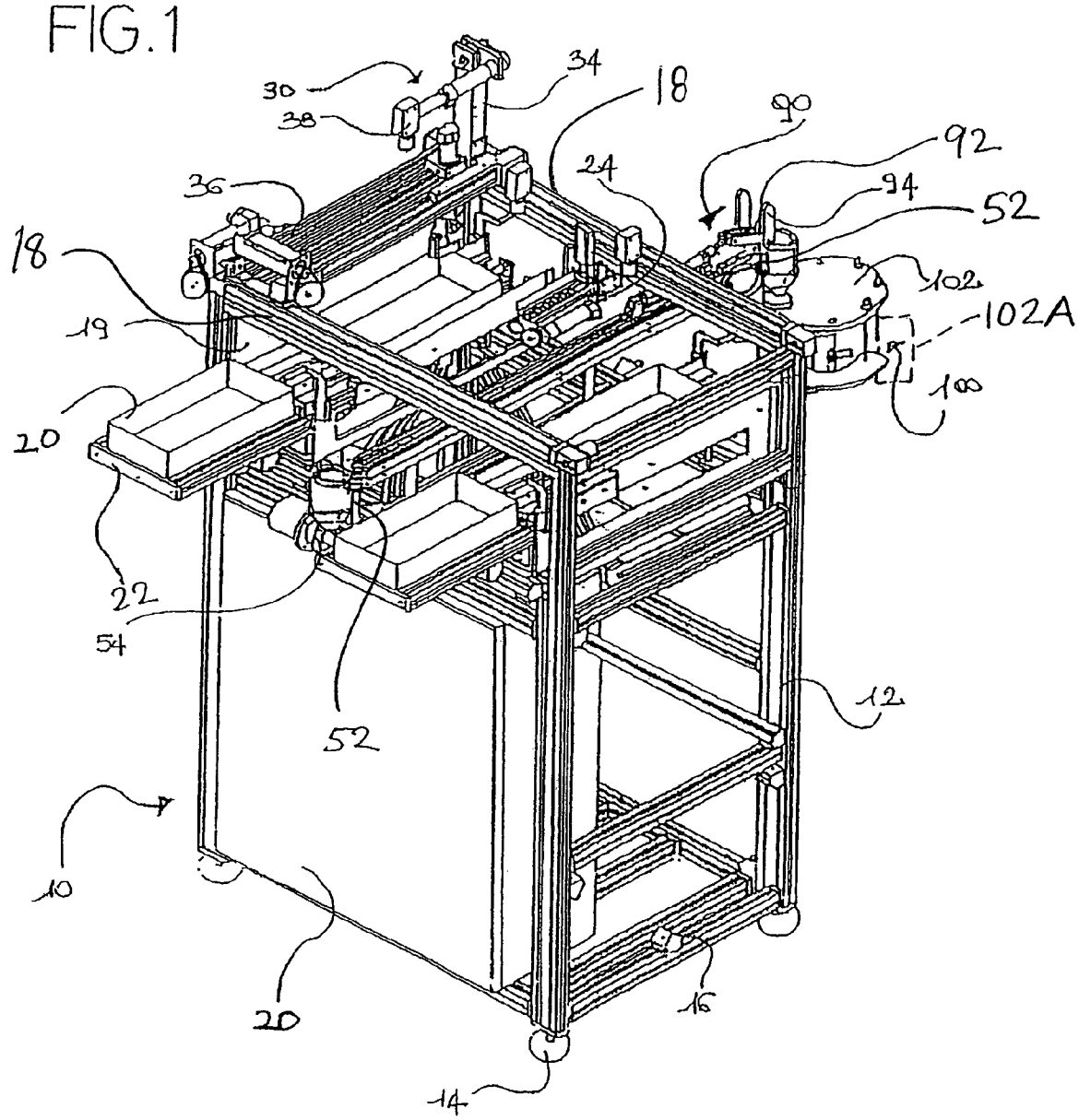
FIG. 1 is a perspective view of a system for singling and transferring objects of the present invention.

With reference now to FIG. 1, a system for singling and transferring objects comprises a housing frame structure 10, preferably in the shape of a parallelepiped formed of four uprights 12 bearing on feet 14. Connected to the uprights 12 is a plurality of transverse bars 16, for reinforcing the frame structure, and of top bars 18 used for the connection of a retrieval device 30.

On the front portion of the frame structure at least two openings 19 are provided, arranged, as will become clearer hereinafter, particularly for the entry of object containers 20, such as, for example, boxes, cartons, carriers for pneumatic despatches or containers in general. Two loading surfaces 22 are connected to the frame 10 in proximity to the openings 19 to facilitate the entry of the containers 20 into the system, and may, for example, but not by way of limitation, be associated in operation with automated container transport devices (not illustrated) to allow the transport of the containers from and/or to a store area, a production line, or other operating stations. Alternatively, at least one loading surface 22 may be loaded manually by an operator in order to insert particular and/or predetermined object containers into the system.

On the rearward portion of the frame 10 a further opening 24 is provided which is employed, in use, for the exit of the singled objects from the system.

Figure 2:
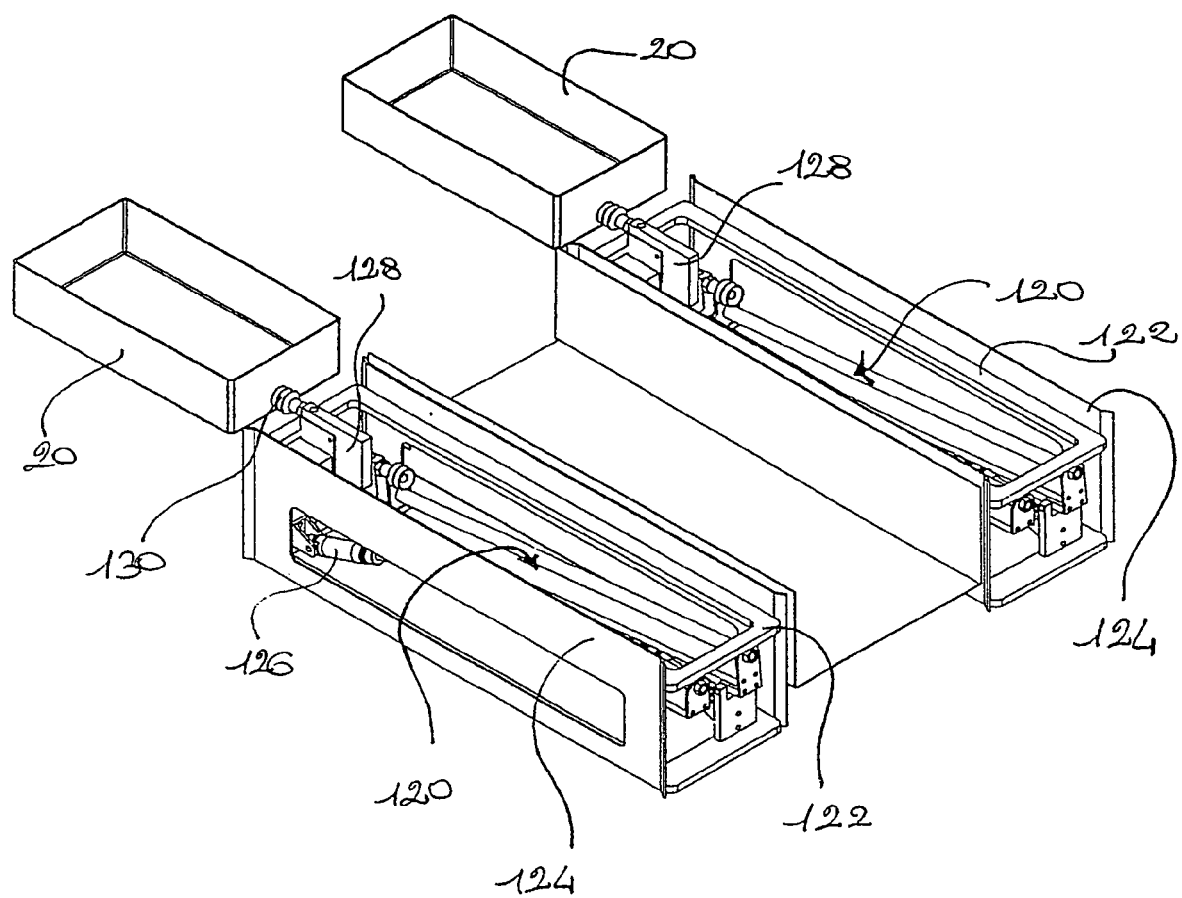
FIG. 2 is a perspective view of a handling device for handling containers of the present invention.

In the upper portion of the frame structure 10 is housed a container handling device to allow the containers 20 to be loaded and/or unloaded within the system. As illustrated more clearly in FIG. 2, the handling device comprises two housing areas 120, each formed of an upper portion arranged to receive a container and a lower portion containing handling members for handling the containers to make it possible to move the containers to and/or from the loading surfaces. In particular, the upper portion is defined by a perimetric base surface 122 and by two lateral walls 124 which form a sliding and housing surface for a container 20. The handling members preferably comprise a hydraulic cylinder 126, having one end connected to the perimetric base surface 122 and one end connected to a lifting device fixed on the bottom of the container handling device. Slidably connected to the hydraulic cylinder 126 is a substantially L-shaped retrieval member 128 comprising on one of its ends anchorage means such as, for example, but not by way of limitation, a suction cup 130. The hydraulic cylinder 126 is connected in operation to motive means (not illustrated), capable of actuating it selectively in any predetermined direction.

It is of course possible to imagine different handling means, for example rollers or conveyor belts, or different anchorage means capable of moving the containers from and/or to the loading surfaces of the system, without thereby departing from the scope of the present invention.

As mentioned previously and as illustrated in FIG. 3, the system for singling and transferring objects also includes a retrieval device 30 comprising a support structure 34 connected so as to be slidable along two top bars 18 of the frame 10 by means of a pair of carriages 32, and a rail 36 disposed transversely with respect to the top bars 18 and the ends of which are connected to the two carriages 32. Slidably connected on the transverse rail 36 is a retrieval device such as, for example, but not by way of limitation, a mobile arm 38 comprising at one of its ends an anchorage member, preferably a suction cup 40. The retrieval arm 38 is capable of retrieving objects contained in one of the containers housed in one of the housing areas of the handling device and depositing it in any other position within the frame structure 10. The retrieval device, in use, may of course carry out object transfer operations also between two containers housed in the aforesaid housing areas, just as it is possible for it to comprise different retrieval means from those illustrated and described, without thereby departing from the scope of the present invention.

Figure 4:
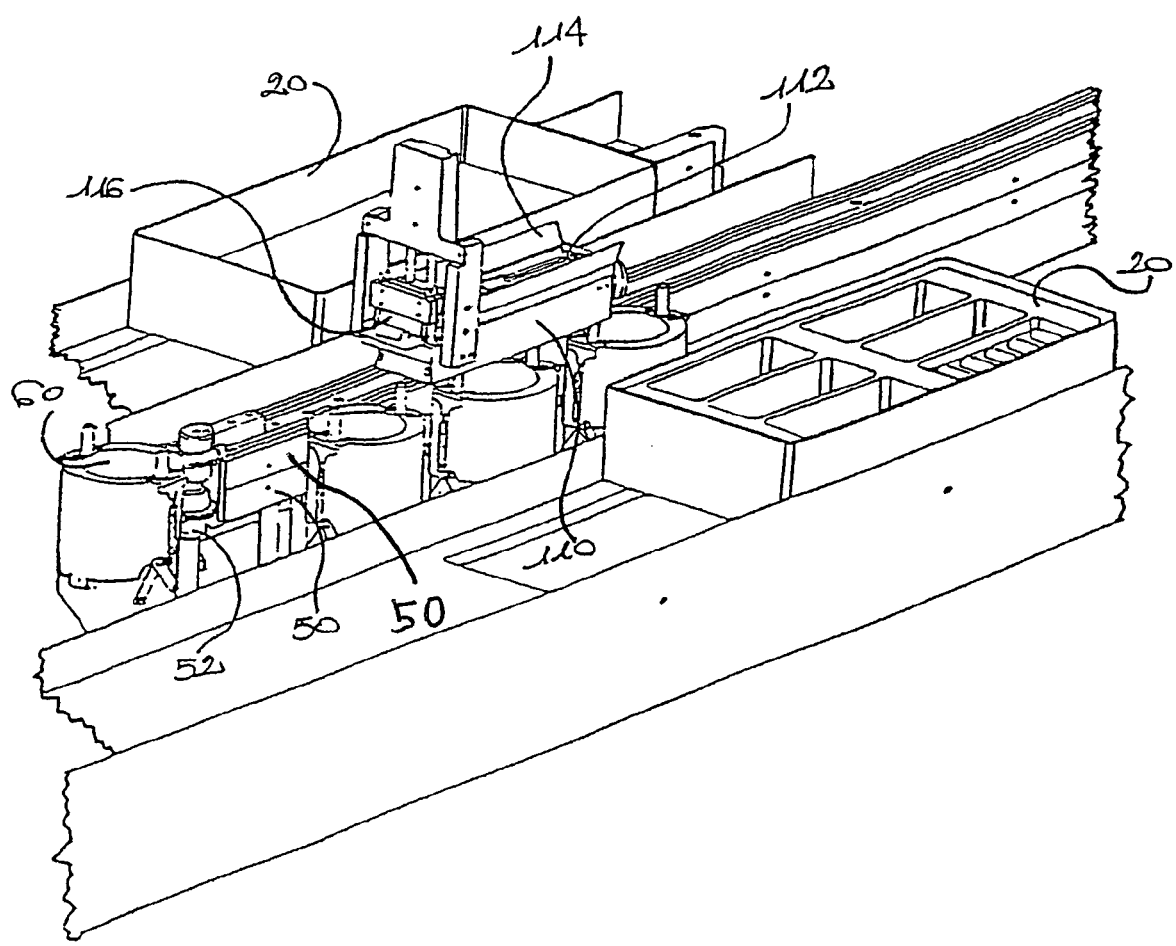
FIG. 4 is a perspective view of a transfer device used in the system.
Figure 5:
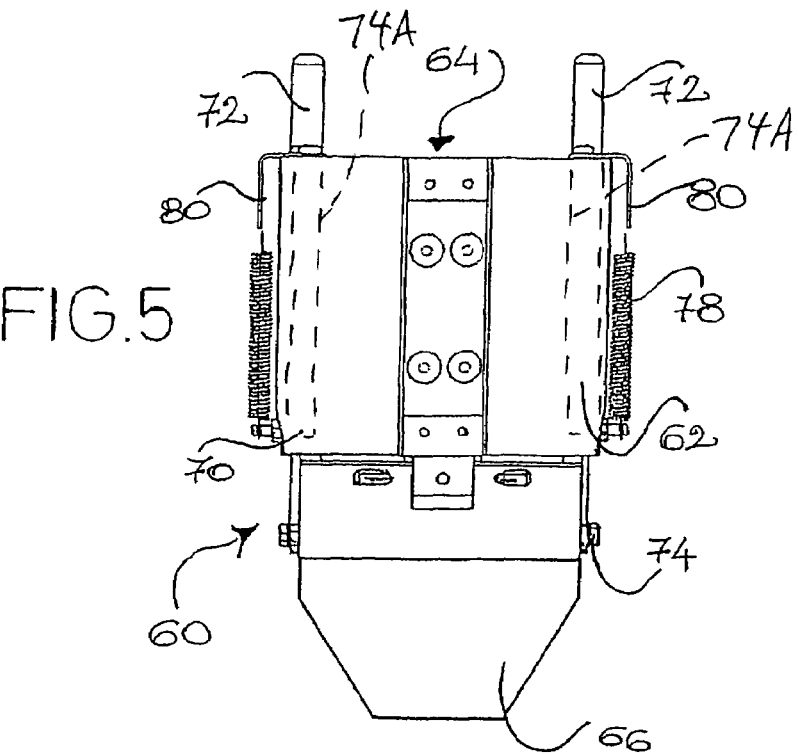
FIGS. 5 and 6 are two perspective views of a cup-type container according to one of the embodiments of the present invention in two different operating positions.
Figure 6:
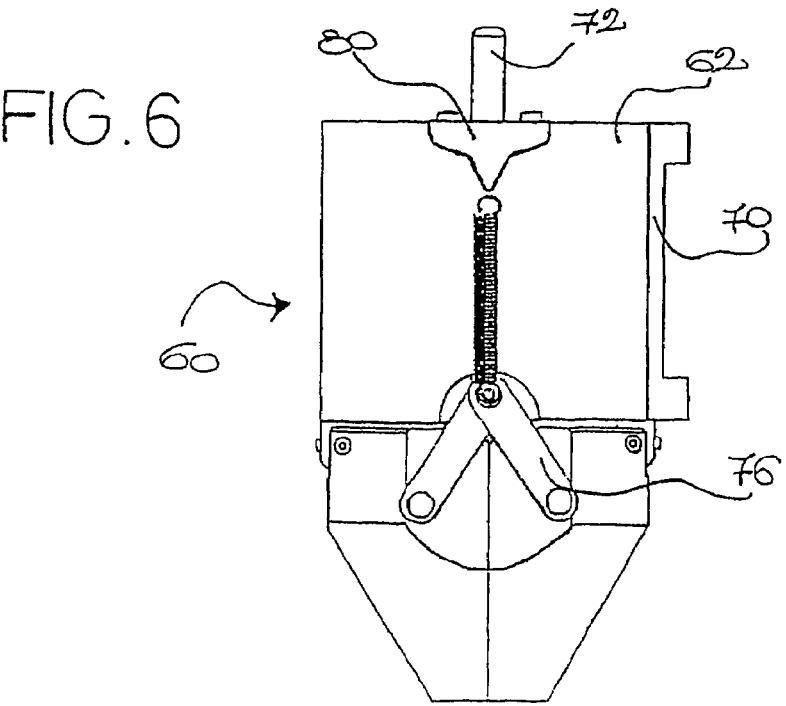
Figure 7:
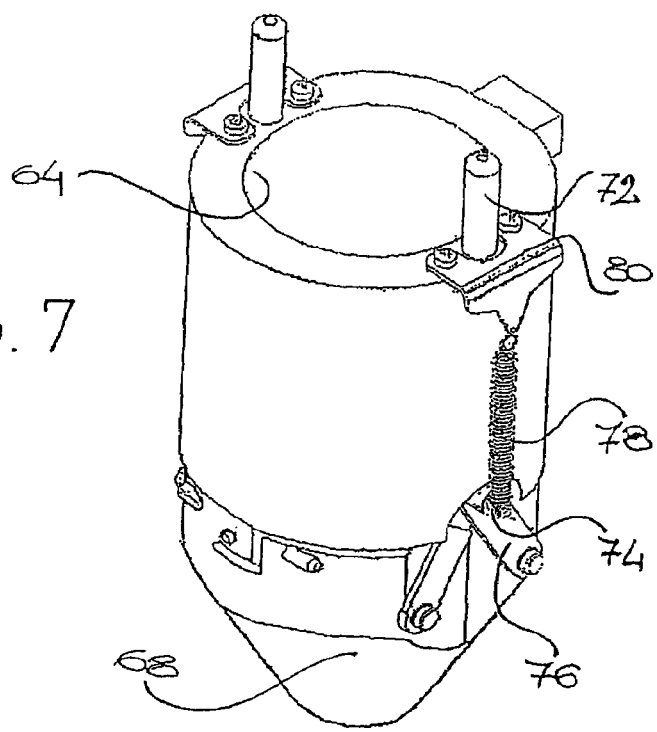
FIG. 7 is a front view of the cup in FIGS. 3 and 4.

With reference now to FIG. 4, the system of the present invention further comprises an object transfer device positioned in the upper portion of the frame structure 10 and disposed between the two housing areas of the handling device. The transfer device comprises a carousel member, for example, but not by way of limitation, which member includes two chains 50 rotatable about two shafts 52 disposed one in proximity to the front wall of the frame structure and one at the opposite end. One of the drive shafts 52 is connected in operation to actuating means 54 such as, for example, electric motors which, in use, permit selective rotation of the chains 50 at predetermined speeds. Engaged between the two rotatable chains 50 are a plurality of substantially cup-shaped containers 60, disposed over the entire length of the carousel member and on both sides, spaced from one another at a predetermined pitch, variable according to the particular usage of the singling and transfer system of the present invention. An expert in the field will of course be able to identify embodiments of the carousel member different from those described above, such as, for example, rotatable structures, belts, and the like.

As illustrated in FIGS. 5 to 8, the cup-type containers 60 comprise an upper portion 62 on which a substantially circular inlet mouth 64 is provided, and a lower frustoconical portion 66 composed of two valves 68 hinged to the wall of the upper portion 62 and connected to each other by means of a caliper device. Engaged on the outer surface of the upper portion 62 are connecting members 70 for connecting the cup 60 to the rotatable chains 50, such as, for example, coupling devices, or hooking devices or the like. Still on the upper portion 62, at the lateral walls, two vertical channels 74A are provided within which are housed two bars 72 of a length substantially greater than the height of the upper portion 62 of the cup 60. The lower ends of the respective vertical bars 72 include protruding pins 74 to which are rotatably connected ends of a pair of opening rods 76. The other ends of the opening rods 76 are respectively fixed, by means of a screw or a pin or other fixing means, to the two valves 68 forming the lower portion of the cup-type container 60. Resilient means, for example tension springs 78, are connected at one end to the protruding pin 74 of the vertical bars 72 and at the other end to a plate 80 fixed on the mouth 64 of the cup 60 in proximity to the channels of the vertical bars 72. As can be clearly seen in FIG. 5, in the rest state the spring 78 keeps the vertical bar 72 raised and protruding with respect to the mouth 64 of the cup, such that the opening rods 76 are brought close to each other and the frustoconical lower portion 66 is closed.

Figure 8:
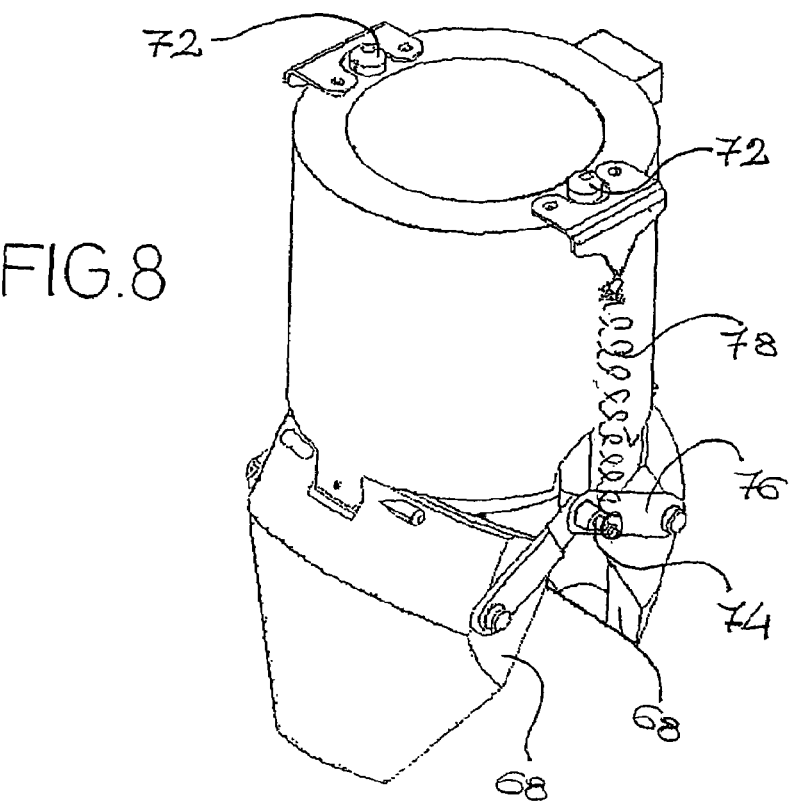
FIG. 8 is a lateral view of the cup illustrated in FIGS. 3 and 4.

Finally, the object transfer device comprises a pressure means 90 disposed in proximity to the end of the carousel member 50 disposed towards the opening 24 of the rearward portion of the frame structure 10. The pressure means 90 comprises an extensible arm 92 to one end of which is fixed a fork-like member 94 connected so as to be rotatable and able to be selectively lowered to press, in use, the vertical bars of the cup-type containers 60. As can be seen in FIG. 8, by lowering the vertical bars 72, and consequently the protruding pin 74, the opening rods 76 move symmetrically away from each other, separating the valves 68 and permitting the opening of the lower frustoconical portion 66 of the cup-type container 60.

Figure 9:
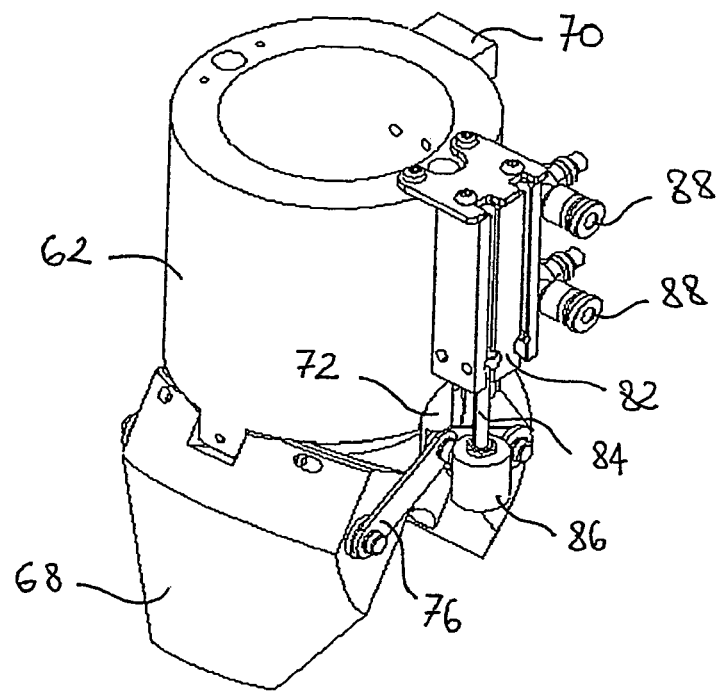
FIG. 9 is a perspective view of a cup-type container according to another of the embodiments of the present invention.
Figure 10:
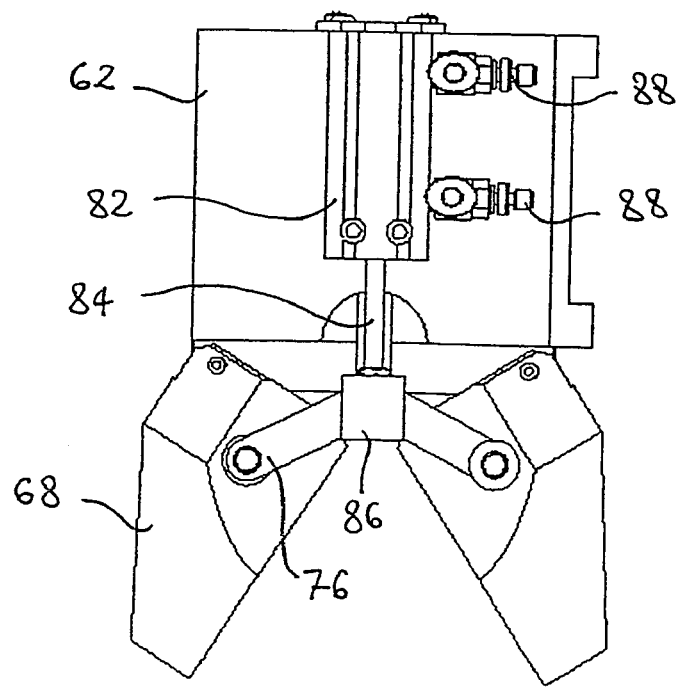
FIG. 10 is a lateral view of the cup-type container of FIG. 9.

In one of the alternative embodiments of the present invention, illustrated in FIGS. 9 and 10, the cup-type containers 60 comprise different opening means for opening the lower portion 66. In particular, an actuating member, preferably, but not necessarily, of pneumatic type, is engaged with the upper portion 62 of the cup-type container 60. The actuator member comprises a body 82 having an inner chamber within which is movably housed a piston connected to a stem 84. One end 86 of the stem 84 is hinged to the protruding pin 74 of the vertical bar 72 and to the ends of each of the opening rods 76. The actuating member further comprises entry means, for example a pair of inlets 88 communicating with the inner chamber of the actuator from opposite sides of the piston. In use, the introduction of compressed air selectively into one of the two inlets 88 causes displacement of the piston in one of the two directions and the consequent raising or lowering of the end 86 of the stem 84. The lowering of the end 86, and consequently of the protruding pin 74, causes the opening rods 76 to move symmetrically away from each other, separating the valves 68. The raising of the end 86 causes the opening rods 76 to move close to each other and consequently the closure of the frustoconical lower portion 66 of the cup-type containers 60.

An expert in the field could of course provide containers having shapes and dimensions different from those described and illustrated hitherto, as well as different opening means for opening the lower portion, without thereby departing from the scope of the present invention, as long as the containers of the transfer device comprise an upper opening and a selectively openable lower portion.

As illustrated in FIG. 1, in proximity to the opening 24 provided on the rearward wall of the frame structure, and at one end of the carousel member 50, a collecting device 100 is located. The collecting device 100 comprises, for example, but not by way of limitation, a packaging device composed of a tower selectively rotatable by actuating means (not illustrated) of known type. A disk member 102 comprises on its upper surface a plurality of openings, preferably funnel-shaped, connected for example to packaging bags 102A (shown schematically in dotted lines in FIG. 1) suspended at the lower surface of the disk member. The packaging device 100 is positioned with respect to the frame structure 10 such as to have, during its rotation, the funnel-shaped openings vertically aligned with the end of the carousel member 50, and therefore of the lower portions of the cup-type containers 60.

In one of the embodiments of the present invention, the funnel-shaped openings of the disk member 102 may be replaced by further cup-shaped containers 60. Such a solution has the particular advantage of using the same member, that is to say, a cup-type container, for objects to be transferred and/or packaging bags of dimensions different from one another, without having to produce funnel-shaped openings of dimensions suitable for each type of the aforesaid objects to be transferred and/or packaging bags.

The system for singling and transferring objects of the present invention, finally, may also comprise an electronic processor and a database for the automatic management of the operations of handling the containers, retrieval and transfer of objects, and of the general functioning of the entire system. In particular, it is possible to insert into the electronic processor a plurality of data regarding the object containers which arrive each time at the entry to the system, for example the type, number and/or location of the objects present within the containers, as well as the quantity, type and sequence of objects which must be transferred to the outlet of the system. The database may also be updated continually, and predetermined sequences of retrieval and/or transfer of objects may be inserted into it in the case of transfer orders which recur frequently.

In use, when one or more object containers 20 are disposed on the loading surfaces 22, the handling device loads said containers into the system. In particular, the lifting device raises the end of the hydraulic cylinder 126 which, by extending, brings the retrieval member 128, and therefore the suction cup 130, close to the lateral surface of the container 20 disposed on the loading surface 22. After the suction cup 130 has engaged with the aforesaid wall, the hydraulic cylinder 126 entrains the retrieval member and loads the container 20 into the housing area 120, sliding it on the upper surface of the perimetric portion 122.

Figure 3:
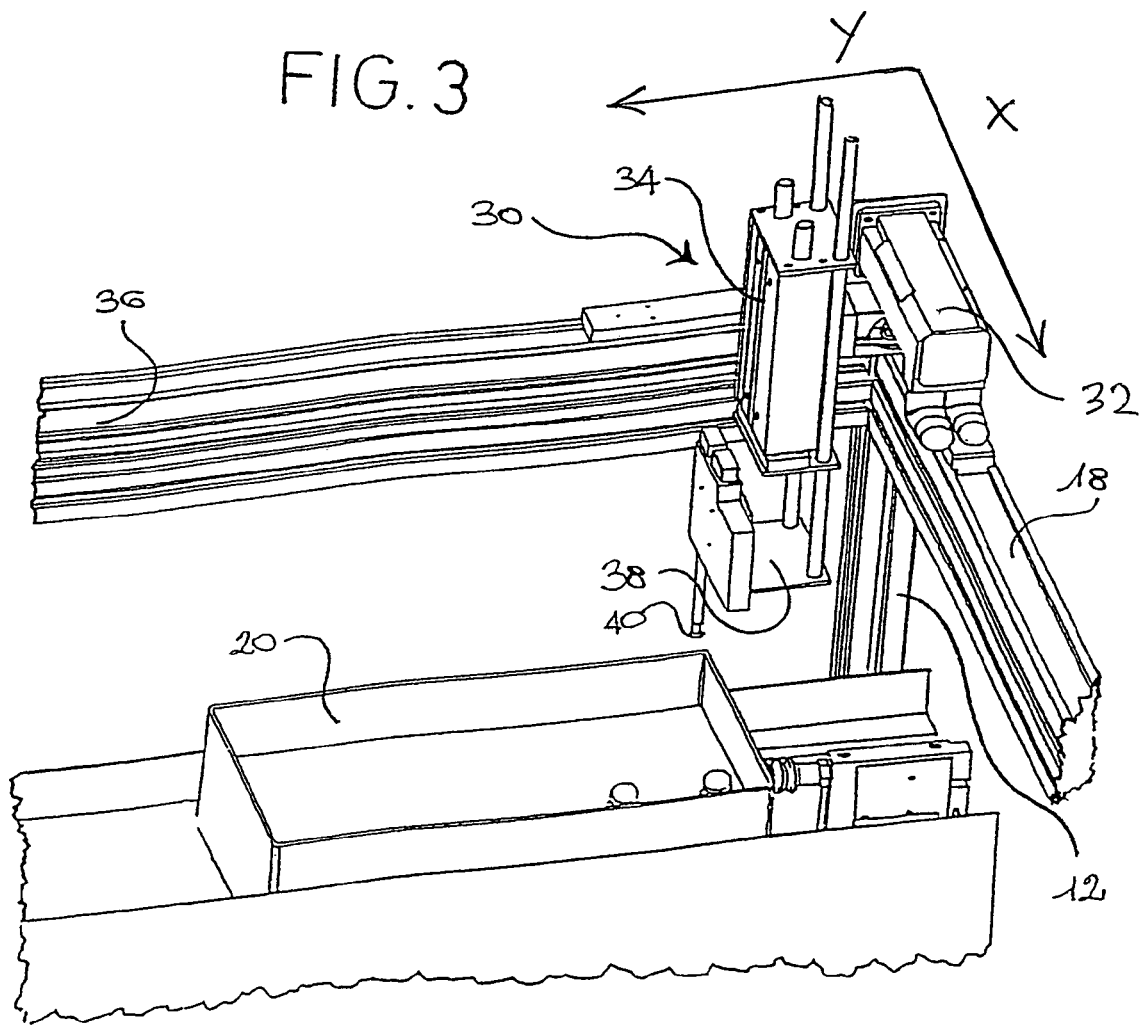
FIG. 3 is a perspective detail view of a retrieval device of the system of the present invention.

Once at least one container 20 is completely located within its housing area, the retrieval device 30 is moved above the container to select and retrieve one or more predetermined objects. In particular, the mobile arm 38 is moved longitudinally by means of the carriages 32 slidably connected to the top bars 18 of the frame structure 10 and transversely along the rail 36 until it reaches a first spatial position defined by two co-ordinates X, Y and corresponding to the location of the object to be retrieved within the container 20. Once the object has been retrieved by means of a suction action of the suction cup 40, the mobile arm 38 is moved towards a second spatial position defined by two further co-ordinates X', Y' and corresponding to an initial position of a cup-type container 60 of the transfer device. In this regard, top bars 18 of frame structure 10 effectively define a first or X axis, and transverse bars 16 as well as rail 36 effectively define a second or Y axis which is transverse to the first axis (FIG. 3). The object is then loaded into the cup 60 and transferred to a final position of a cup-type container 60 corresponding to the opening 24 provided on the rearward portion of the frame structure 10. When this position has been reached, the opening means proceed to separate the valves 68 and, by gravity, unload the object contained in the cup into the funnel-shaped opening of the packaging device 100.

The retrieval device can repeat this operation until the object container 20 has been completely emptied, each time unloading the retrieved objects into a different cup-type container 60 made available by the rotatory action of the carousel member 50. Once the container 20 is emptied, or once the retrieval operation is completed, the mobile arm 38 is moved over the second drawer 20 housed within the system, while the handling device proceeds to unload said container outside the system on the loading surface 22, and to load another one with objects to be singled and transferred. When the action of object retrieval on the second container has been completed, the steps described above are repeated in the same sequence.

According to some particularly advantageous procedures of the present invention, the retrieval operations may also comprise more complex steps that are difficult to perform with systems of known type. In a first embodiment, for example, the operation of retrieval of the objects may be performed alternately on both the drawers, in such a way as to transfer different types of objects selectively into the cup-type containers, or in such a way as to transfer several objects of different types into a single cup-type container.

In the field of pharmaceutical and medical products, for example, such a procedure makes it possible to package easily and rapidly in a single pack a syringe and a phial necessary for the administration of a drug. Still in this field, for example, in the case of a drug store within a hospital, it is possible to make available to the patients a single pack containing different pharmaceutical and/or medical products to be taken over a predetermined period of time, a week, a day or even every hour, so that the patient takes the drugs at the correct intervals of time.

According to a particularly advantageous characteristic of the present invention, the system also comprises a device for singling packs containing a plurality of objects, such as, for example, a blister pack cutting machine. As illustrated in FIGS. 1 and 4, the collecting and singling device comprises a main structure 110 within which is provided a housing area 112, of substantially rectangular shape and provided with a pair of protruding lateral walls 114 arranged in a funnel shape with respect to the main structure 110. A cutting means, for example a tempered steel blade 116, is connected to the structure by means of a guillotine mechanism, and handling means make it possible to bring the packs arranged in the housing area towards said mechanism. The pack singling device is placed within the frame structure in proximity to the carousel member 50 and, in particular, the end of the main structure comprising the guillotine mechanism is vertically aligned with the circular path of the cup-type containers 50 of the transfer device.

In use, a blister pack is disposed within the housing area 112, for example, but not by way of limitation, by the retrieval device 30, and is advanced close to the guillotine mechanism. When the system is to transfer one of the tablets contained in the blister pack, the steel blade 116 is lowered, cutting the portion of the blister pack containing the tablet and causing it to fall, by gravity, into a cup-type container 60 which proceeds to transfer it to the collecting device 100.

According to another characteristic of the present invention, on the front wall of the frame a third opening is provided which allows the emergence of a cup-type container connected to the carousel member, and defines the initial position thereof. In this way it is possible to insert manually and directly into the cup one or more objects which are intended to be transferred to the collecting device, and which are not, for example, available within the object containers.

With the principle of the invention remaining the same, the embodiments and details of production of the present invention may of course vary widely with respect to what has been described and illustrated, without thereby departing from the scope of the present invention.

The invention claimed is:

1. A system for singling and transferring objects comprising:
    a support frame having an inlet area where objects enter into said system and an outlet area where objects exit from said system, said support frame defining first and second axes which are transversely oriented relative to one another;
    a container handling arrangement disposed on said support frame and defining a plurality of housing areas for loading respective object containers, each said object container being configured for containing therein a plurality of objects to be singled and transferred, each object being located in a position within a said object container defined by a first pair of coordinates respectively defined along the first and second axes;
    an object transfer arrangement disposed on said support frame and supporting a plurality of containment members for movement along a continuous path, each said containment member being movable into a position within said support frame defined by a second pair of coordinates respectively defined along the first and second axes and different from said first pair of coordinates, said handling arrangement comprising a handling device actuable to move a said object container relative to the respective said housing area in different and opposed directions, anchorage means connected to said handling device and disposed to engage with said object container, said housing areas each comprising a surface for slidably receiving a said object container, said handling device being arranged to be selectively lowered to disappear beneath said surface, said surface comprising a perimetric base surface and two walls disposed on opposite sides of said base surface and projecting upwardly beyond said base surface for slidably receiving said object container; and
    a retrieval and singling device mounted on said support frame adjacent said inlet area, said retrieval and singling device comprising an arm mounted for sliding movement relative to said support frame along both of the first and second axes, said arm being movable along both of the first and second axes and configured for picking up one object at the first pair of coordinates from a said object container and transferring the one object into one of said containment members at the second pair of coordinates, each said containment member being configured for containing therein a predetermined plurality of objects picked up by said arm and transferred from said inlet area to said outlet area.

2. The system according to claim 1, wherein said transfer arrangement comprises a carousel structure for supporting said containment members, said carousel structure being selectively actuable to rotate said containment members along the continuous path.

3. The system according to claim 2, wherein each said containment member comprises an inlet mouth configured and disposed for allowing loading of the objects into said containment member and a selectively openable portion configured and disposed for allowing unloading of the objects from said containment member.

4. The system according to claim 3, wherein each said containment member mounts thereon a generally vertically oriented and selectively displaceable bar having an upper end disposed adjacent an upper surface of said inlet mouth and a lower end operatively connected to said openable portion, said transfer arrangement further including pressure means comprising an extendable arm which is selectively movable into engagement with said upper end of said bar to cause opening of said openable portion of said containment member.

5. The system according to claim 2, wherein said carousel structure comprises a chain rotatable around two spaced-apart drive shafts, and actuating means for permitting selective rotation of said chain at a predetermined speed.

6. The system according to claim 1, wherein each said containment member comprises a main body having an upper portion in which an inlet mouth is provided for allowing insertion of object into said containment member, a selectively openable lower portion, opening means to permit opening of said lower portion, wherein a distance between opposed inner wall surfaces of said lower portion is smaller than a distance between opposed inner wall surfaces of said inlet mouth, said main body comprising on said upper portion at least one vertically-oriented channel defined in a lateral wall of said upper portion and configured to house said opening means to permit the opening of said lower portion.

7. The system according to claim 6, wherein said lower portion comprises a pair of valves hingedly connected to said upper portion.

8. The system according to claim 7, wherein a pair of said vertically-oriented channels are disposed in respective lateral walls of said upper portion, said opening means comprising a bar disposed in each said channel, said bars having upper ends projecting upwardly beyond an upper surface of said upper portion and lower ends associated with said lower portion to cause opening of said valves of said lower portion.

9. The system according to claim 8, wherein said bars are selectively movable downwardly within and relative to the respective said channels so as to cause opening of said valves.

10. The system according to claim 1, wherein each said containment member comprises a main body having an upper portion in which an inlet mouth is defined for allowing insertion of an object into said containment member, a selectively openable lower portion defined by two valves hinged to a wall of said upper portion, at least one opening bar connected to said main body, and a pair of opening rods, each said opening rod having one end fixed to said opening bar and opposite ends of said opening rods being respectively fixed to said two valves such that movement of said opening bar in a direction toward said valves causes said opening rods to simultaneously open said valves.

11. The system according to claim 10, wherein a lower end of said opening bar mounts thereon a protruding pin to which said one ends of the respective said opening rods are pivotably attached.

12. The system according to claim 11, wherein a resilient member is connected at one end to said protruding pin and at the other end to a plate fixed on said inlet mouth, said resilient member biasing said valves in a closed position.

13. The system according to claim 12, wherein said opening bar has an upper end disposed adjacent an upper surface of said upper portion and when actuated causes downward movement of said opening bar relative to said upper portion against the biasing force of said resilient member such that said opposite ends of said opening rods are moved away from one another and open said valves.

14. The system according to claim 10, wherein said upper portion defines two substantially vertically oriented channels and said containment member comprises a pair of said opening bars, one said opening bar being disposed in each said channel, a length of each said opening bar being substantially greater than a height of said upper portion.

15. The system according to claim 1, wherein said handling arrangement defines two of said housing areas, each said area being formed of an upper portion arranged to receive a said object container on said surface, and a lower portion containing said handling device.

16. The system according to claim 1, wherein said support frame includes a pair of spaced-apart frame members both oriented generally parallel to the first axis and a rail disposed transversely between said frame members and oriented generally parallel to the second axis, said arm being mounted on said rail for slidable movement relative thereto to permit movement of said arm along the second axis, said rail having opposite ends each slidable along the respective said frame members to permit movement of said rail and said arm along the first axis.

17. the system according to claim 16, wherein said frame members are located in an upper region of said support frame, said container handling arrangement and said containment members being disposed beneath said frame members.

18. The system according to claim 16, wherein said handling device can be actuated to move a said object container relative to said support frame and the corresponding said housing area in a direction generally parallel to the second axis.

19. The system according to claim 1, wherein said arm comprises a suction cup for picking up one object container and transferring the one object to one of said containment members.

* * * * *